(12) United States Patent
Ranger

(10) Patent No.: US 6,301,584 B1
(45) Date of Patent: Oct. 9, 2001

(54) SYSTEM AND METHOD FOR RETRIEVING ENTITIES AND INTEGRATING DATA

(75) Inventor: Denis Ranger, Morris Plains, NJ (US)

(73) Assignee: Home Information Services, Inc., New York, NY (US)

( * ) Notice: Subject to any disclaimer, the term of this patent is extended or adjusted under 35 U.S.C. 154(b) by 0 days.

(21) Appl. No.: 09/137,937

(22) Filed: Aug. 21, 1998

Related U.S. Application Data

(63) Continuation-in-part of application No. 08/915,662, filed on Aug. 21, 1997, now Pat. No. 5,999,940.
(60) Provisional application No. 60/056,523, filed on Aug. 21, 1997.

(30) Foreign Application Priority Data

May 28, 1998 (EP) .................................................. 98201847

(51) Int. Cl.[7] .................................................. G06F 17/30
(52) U.S. Cl. .......................... 707/103; 707/505; 345/329
(58) Field of Search .............................. 705/26; 706/54; 345/349, 329; 395/683; 707/201, 100, 103, 102, 505; 709/206

(56) References Cited

U.S. PATENT DOCUMENTS

| | | | |
|---|---|---|---|
| 5,491,820 | 2/1996 | Belove et al. | 707/3 |
| 5,560,005 | 9/1996 | Hoover et al. | 707/10 |
| 5,644,764 * | 7/1997 | Johnson et al. | 707/103 |
| 5,659,736 * | 8/1997 | Hasegawa et al. | 707/100 |
| 5,717,925 * | 2/1998 | Harper et al | 707/102 |
| 5,740,549 | 4/1998 | Reilly et al. | 705/14 |
| 5,761,500 | 6/1998 | Gallant et al. | 707/10 |
| 5,761,663 | 6/1998 | Largarde et al. | 707/10 |
| 5,809,502 | 9/1998 | Burrows | 707/7 |
| 5,893,913 * | 4/1999 | Brodsky et al. | 707/201 |
| 5,895,470 * | 4/1999 | Pirolli et al. | 707/102 |
| 5,948,058 * | 9/1999 | Kudoh et al. | 709/206 |
| 5,999,179 * | 12/1999 | Kekic et al. | 345/349 |
| 5,999,940 * | 12/1999 | Ranger | 707/103 |
| 6,014,637 * | 1/2000 | Fell et al. | 705/26 |
| 6,016,393 * | 1/2000 | White et al. | 395/683 |
| 6,081,798 * | 6/2000 | Johnson et al. | 706/54 |
| 6,166,732 * | 12/2000 | Mitchell et al. | 345/329 |
| 6,169,993 * | 1/2001 | Shutt et al. | 707/103 |
| 6,192,381 * | 2/2001 | Stiegemeier et al. | 707/505 |

* cited by examiner

Primary Examiner—Thomas Black
Assistant Examiner—Charles L. Rones
(74) Attorney, Agent, or Firm—McDermott, Will & Emery

(57) ABSTRACT

A data integration system and method gathers information dynamically from one or more data sources, which may be located at different servers and have incompatible formats, structures the information into a configurable, object-oriented information model, and outputs the information for the user according to an associated, configurable visual representation with automatic content classification.

27 Claims, 12 Drawing Sheets

```
BOOK

ATTRIBUTES          DEFAULT CLASS
(product) ID
(product) Supplier      Supplier
(product) Type
Title
Author

CONTENTS            DEFAULT CLASS

Edition             Edition
Review              Review
Chapter 1           Chapter
Chapter 2           Chapter
```

Staff

View by employee id
  <=#236->#342

View by first name
  Al - Bob - Bill - John

View by last name
  Johnson - Smith

View by city
  Albany - Hoboken - New York -

View by state
  NJ - NY

PRODUCT (227-2) : agent # 20 (227-1)
Description (227-4) : Store database
Confidence (227-8) : 100 %
Time Out (227-7) : 3600 seconds
Sequence (227-3) : 10
Local (227-9) : No
Disabled (227-10) : No
Authoritative (227-11) : Yes
Mutator (227-12) : No
Specialty (227-6) : ODBC
Source (227-13) : Store
Code (227-15) : SELECT DISTINCTROW Key, Type, Supplier from Products
Columns :   (228-2) (228-3)
            1    =    ID
            2    =    Type
            3    =    Supplier

FIG. 12

PRODUCT (227-2) : agent # 22 (227-1)
Description (227-4) : Store database
Confidence (227-8) : 100 %
Time Out (227-7) : 3600 seconds
Sequence (227-3) : 10
Local (227-9) : No
Disabled (227-10) : No
Authoritative (227-11) : Yes
Mutator (227-12) : No
Specialty (227-6) : ODBC
Source (227-13) : Library
Code (227-15) : SELECT Chap where Key = %ID from Chapterlist
Content class = chapter

FIG. 13

Book (227-2) : agent # 21 (227-1)

Description (227-4) : Library of congress

Confidence (227-8) : 100 %

Time Out (227-7) : 1 minute

Sequence (227-3) : 20

Local (227-9) : No

Disabled (227-10) : Yes

Authoritative (227-11) : Yes

Mutator (227-12) : No

Specialty (227-6) : Web

URL (227-13) : http://lcweb.loc.gov/cgi-bin/browse.pl

Parameters (227-15) :

```
tnaddress=locis.loc.gov
keystroke_file=tnlocis.txt
db=PREM
action=card
command=prem
slctoptne=
prefix=
screentitle=LCCN+Search+For:
searchtype=LCCN
startitem=1
userinput=@ID
```

| Pattern : | (228-2) | (228-4) | (228-3) |
|---|---|---|---|
| | *fail* | Text | could not be located\| Sorry |
| | Author | Text | \b(?:AUTHOR\|OTHER NAME):\s*(.*? |
| | Description | Text | TITLE:\s*(1*?)\s*/ |
| | ... | ... | ... |

FIG. 14

SYSTEM AND METHOD FOR RETRIEVING ENTITIES AND INTEGRATING DATA

RELATED APPLICATIONS

This application is a continuation-in-part of U.S. patent application Ser. No. 08/915,662, filed Aug. 21, 1997, now U.S. Pat. No. 5,999,940 entitled "Interactive Discovery Tool and Methodology," issued on Dec. 7, 1999 by Denis Ranger, the contents of which are incorporated by reference herein, and claims the benefit of U.S. Provisional Application No. 60/056,523, entitled "Method of Data Integration," filed on Aug. 21, 1997 by Denis Ranger, the contents of which are incorporated by reference herein.

FIELD OF THE INVENTION

The present invention relates to data processing and, more particularly, to information discovery and visualization.

BACKGROUND OF THE INVENTION

There is a vast amount of information in the world today that is available by computer. For example, on the World Wide Web alone there are millions of web pages. In addition to the Internet, companies have set up local "intranets" for storing and accessing data for running their organizations. However, the sheer amount of available information is posing increasingly more difficult challenges to conventional approaches.

A major difficulty to overcome is that information relevant to a purpose of a user is often dispersed across the network at many sites. It is often time-consuming for a user to visit all these sites. One conventional approach is a search engine. A search engine is actually a set of programs accessible at a network site within a network, for example a local area network (LAN) at a company or the Internet and World Wide Web. One program, called a "robot" or "spider," pre-traverses a network in search of documents and builds large index files of keywords found in the documents.

A user of the search engine formulates a query comprising one or more keywords and submits the query to another program of the search engine. In response, the search engine inspects its own index files and displays a list of documents that match the search query, typically as hyperlinks. When a user activates one of the hyperlinks to see the information contained in the document, the user exits the site of the search engine and terminates the search process.

Search engines, however, have their drawbacks. For example, a conventional search engine suffers from obsolescence of data in its search indexes due to pre-traversing a network to index documents. Documents are constantly being updated, but it may take months for the new information to filter down to search engines. Furthermore, a search engine is oriented to discovering textual information only. In particular, conventional search engines are not well-suited to indexing information contained in structured databases, e.g. relational databases, and mixing data from incompatible data sources is difficult in conventional search engines.

Attempts have been made to present search results in an object-oriented fashion by homogenizing the search results into an "entity" that is an instance of a specified class, which may be hierarchically dependent upon another "base" class. A class specifies the attributes or properties of an entity, and a dependent class includes the attributes of the base class and additional attributes. A problem with such attempts is that the particular data returned for a particular entity is restricted to the attributes defined for the specified class of the entity. This restriction means that if the entity to be returned actually belongs to a dependent class, hierarchically dependent upon the specified class, the number of attributes returned to the user will be limited to the properties for the base class, not the dependent class. Consequently, some search results will be not be found and presented to the user. If, however, the user wants to check if a particular entity belongs to a dependent class, another query to the system has to be submitted, specifying the particular dependent class. This checking operation becomes more time consuming as more dependent classes are specified and more entities are found.

SUMMARY OF THE INVENTION

There exists a need for a mechanism to collect relevant information located at a plurality of sites and stored in plurality of incompatible formats according to configurable search strategies.

These and other needs are met by the present invention, which dynamically gathers information from a diversity of data sources with agents, organizes the information in an configurable, information model, and visualizes the information according to a view.

Accordingly, one aspect of the invention relates to an entity retrieving system connectable to at least one data source comprising a memory and a processor connected to an interface. The memory stores a number of classes, in which each class defines the structure of an entity, including property definitions that identify property values stored in the data sources and to be retrieved dedicated to the property definition. The classes include at least one dependent class that is hierarchically linked to at least one other class and contains additional property definitions specifying additional property values, in addition to the property values of the class from which it depends.

The processor, in cooperation with the interface, is configured for receiving a query, which includes an identifier for identifying a particular class and at least one of the property values. The processor also selects, among the classes, the particular class dedicated to the identifier under control of said query, accesses the data sources, retrieves property values pertaining to at least one particular entity that comprises that property value, and outputs the retrieve entities. Upon establishing that the particular entity pertains to one of said dependent classes of the selected particular class, the processor is configured to retrieve the additional properties of the dependent class. According to another aspect, the processor is configured for invoking a plurality of agents concurrently to gather the requested information from the data sources.

Additional objects, advantages, and novel features of the present invention will be set forth in part in the description that follows, and in part, will become apparent upon examination or may be learned by practice of the invention. The objects and advantages of the invention may be realized and obtained by means of the instrumentalities and combinations particularly pointed out in the appended claims.

BRIEF DESCRIPTION OF THE DRAWINGS

The present invention is illustrated by way of example, and not by way of limitation, in the figures of the accompanying drawings and in which like reference numerals refer to similar elements and in which:

FIGS. 12 to 14 illustrate examples of agents.

DESCRIPTION OF THE PREFERRED EMBODIMENT

A method and apparatus for data integration are described. In the following description, for purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Hardware Overview

Figure 1:
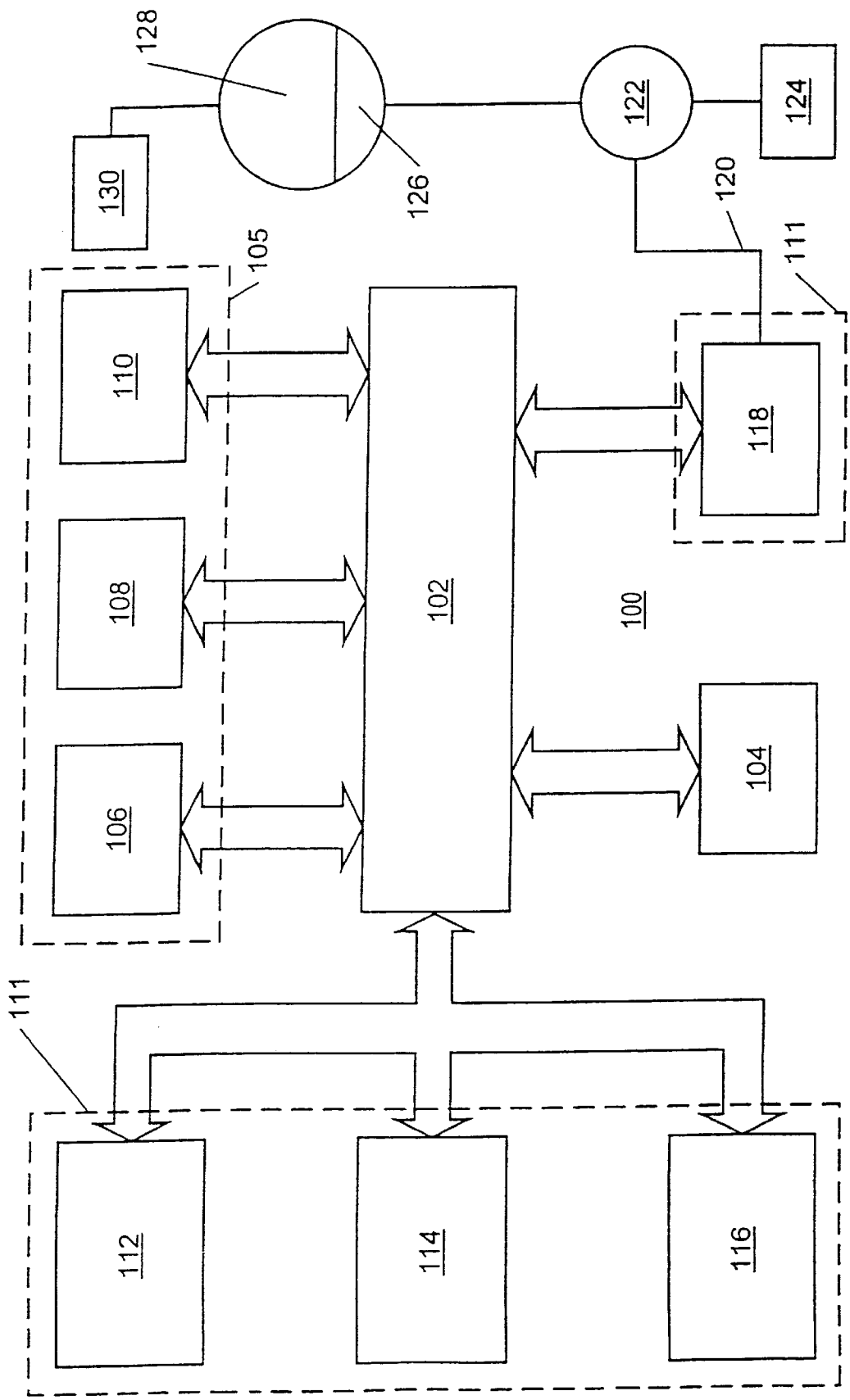
FIG. 1 is a high-level block diagram of a computer system with which an embodiment of the present invention can be implemented.

FIG. 1 is a block diagram which illustrates a computer system 100 upon which an embodiment of the invention may be implemented. Computer system 100 includes a bus 102 or other communication mechanism for communicating information, and a processor 104 coupled with bus 102 for processing information. Computer system 100 also includes computer memory 105 comprising main memory 106, read only memory (ROM) 108, and storage device 110. Main memory 106, such as a random access memory (RAM) or other dynamic storage device, is coupled to bus 102 for storing information and instructions to be executed by processor 104. Main memory 106 may also be used for storing temporary variables or other intermediate information during execution of instructions to be executed by processor 104. Computer memory 105 further includes ROM 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to an interface 111, typically including display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), which allows the device to specify positions in a plane.

The invention is related to the use of computer system 100 to discover, integrate, and visualize information according to a configurable information model. According to one embodiment of the invention, information discovery, integration, and visualization is provided by computer system 100 in response to processor 104 executing sequences of instructions contained in main memory 106. Such instructions may be read into main memory 106 from another computer-readable medium, such as storage device 110. However, the computer-readable medium is not limited to devices such as storage device 110. For example, the computer-readable medium may include a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave embodied in an electrical, electromagnetic, infrared, or optical signal, or any other medium from which a computer can read. Execution of the sequences of instructions contained in main memory 106 causes processor 104 to perform the process steps previously described. In alternative embodiments, hard-wired circuitry may be used in place of or in combination with software instructions to implement the invention. Thus, embodiments of the invention are not limited to any specific combination of hardware circuitry and software.

Computer system 100 also includes a communication interface 118 coupled to bus 102. Communication interface 108 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals which carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals which carry digital data streams. The signals through the various networks and the signals on network link 120 and through communication interface 118, which carry the digital data to and from computer system 100, are exemplary forms of carrier waves transporting the information. Consequently, computer system 100 is capable of accessing data sources at a variety of locations. For example, data sources may be stored internally in memory 105 or external at host device 124, connected through network link 120 and local network 122, and at server 130, connected to local network 122 through ISP 126 and Internet 128.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application provides for information discovery and visualization as described herein. The received code may be executed by processor 104 as it is received, and/or stored in storage device 110, or other non-volatile storage for later execution. In this manner, computer system 100 may obtain application code in the form of a carrier wave.

Network Overview

Figure 2:
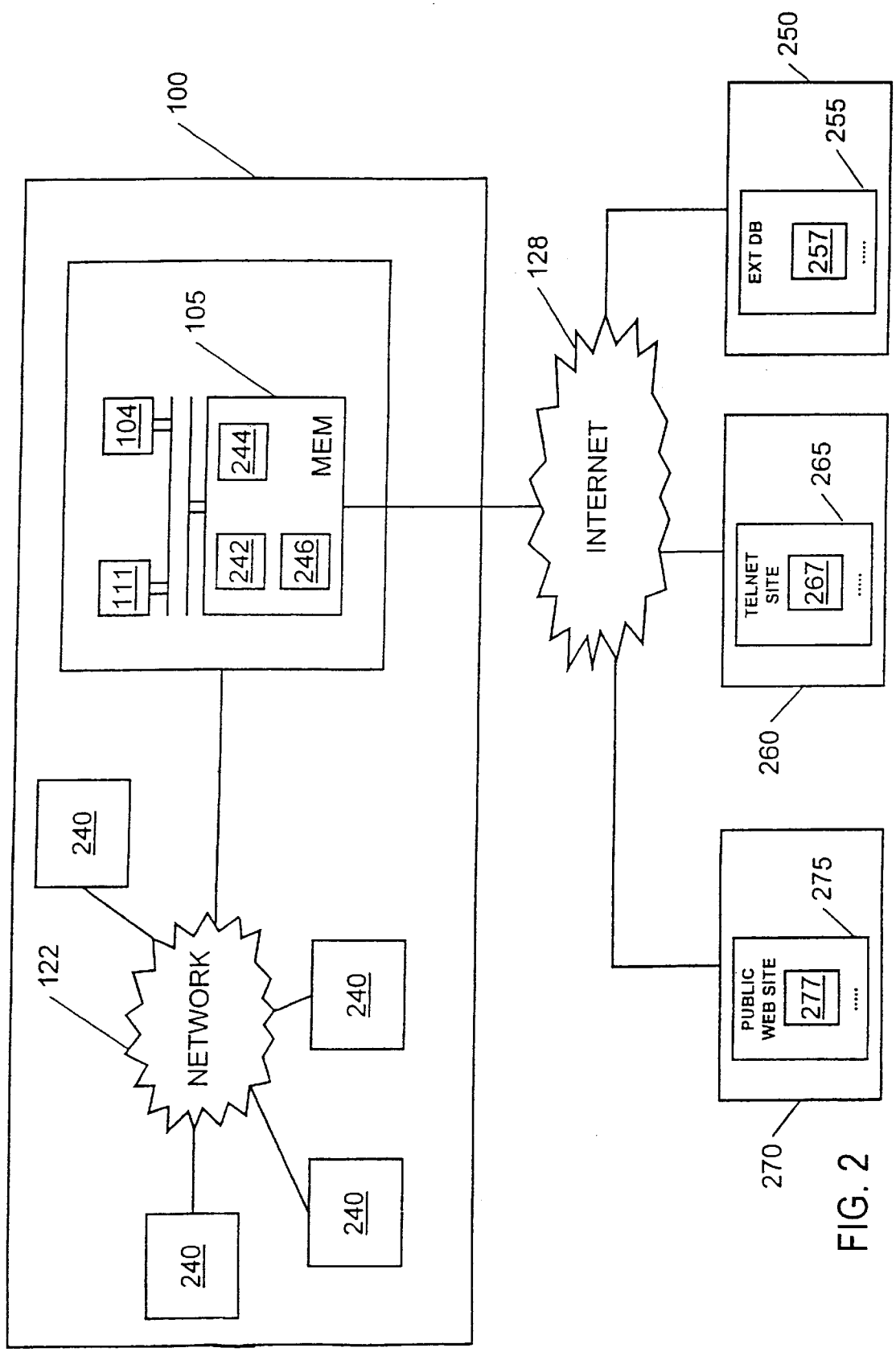
FIG. 2 is a schematic diagram of a network in which an embodiment can be implemented.

FIG. 2 shows an alternative configuration of data discovery, integration, and visualization system 100 for retrieving entities within a computer network, in which a plurality of data sources are stored. The retrieved entities may be represented to a plurality of users at respective personal computers 240 with a user interface, in particular a web browser. The personal computers 240 are coupled, through network 122 to a network computer 126, acting as a web server and enabling a connection to the Internet 128. The network computer 126 comprises memory 105 into which several databases are stored, for example spreadsheets 242, internal web sites 244 or other databases 246. External data source formats may include external databases 257, telnet sites 267, and public web sites 277, stored in respective memories 255, 265 and 275 in respective computer systems 250, 260, 270. According to other embodiments, the internal and external data sources include video or sound. Entity retrieving system 100 can retrieve entities stored in data sources with different formats, as described hereinafter.

INFORMATION METAMODEL

Figure 3:
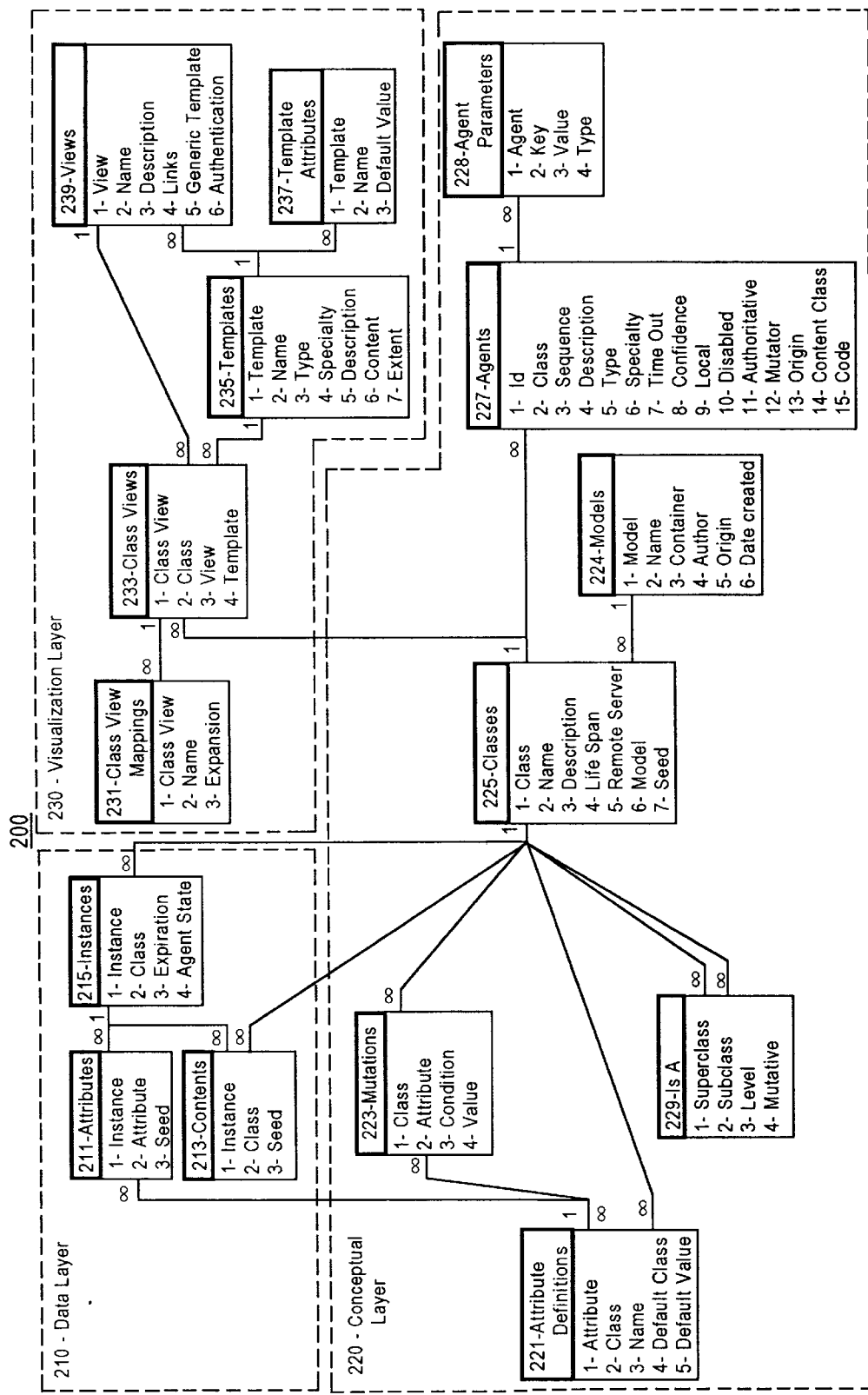
FIG. 3 is a schematic diagram of data structures employed by an embodiment of the invention.
Figures 7, 8:
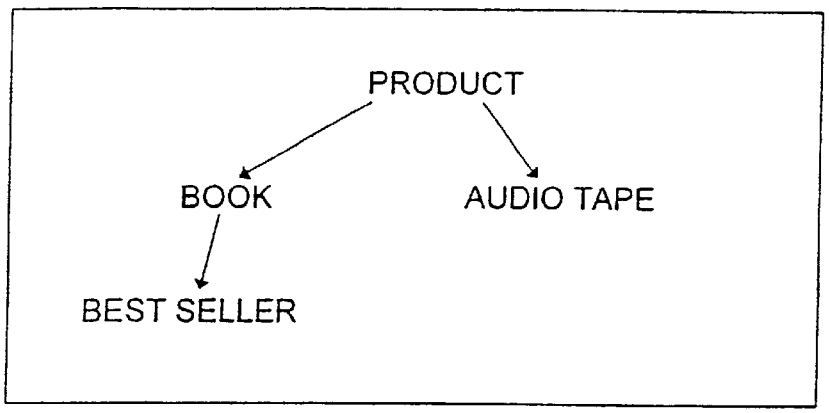
FIG. 7 illustrates an example of a number of classes with their hierarchy.
FIG. 8 illustrates an example of the attributes and contents of a class
Figure 9:
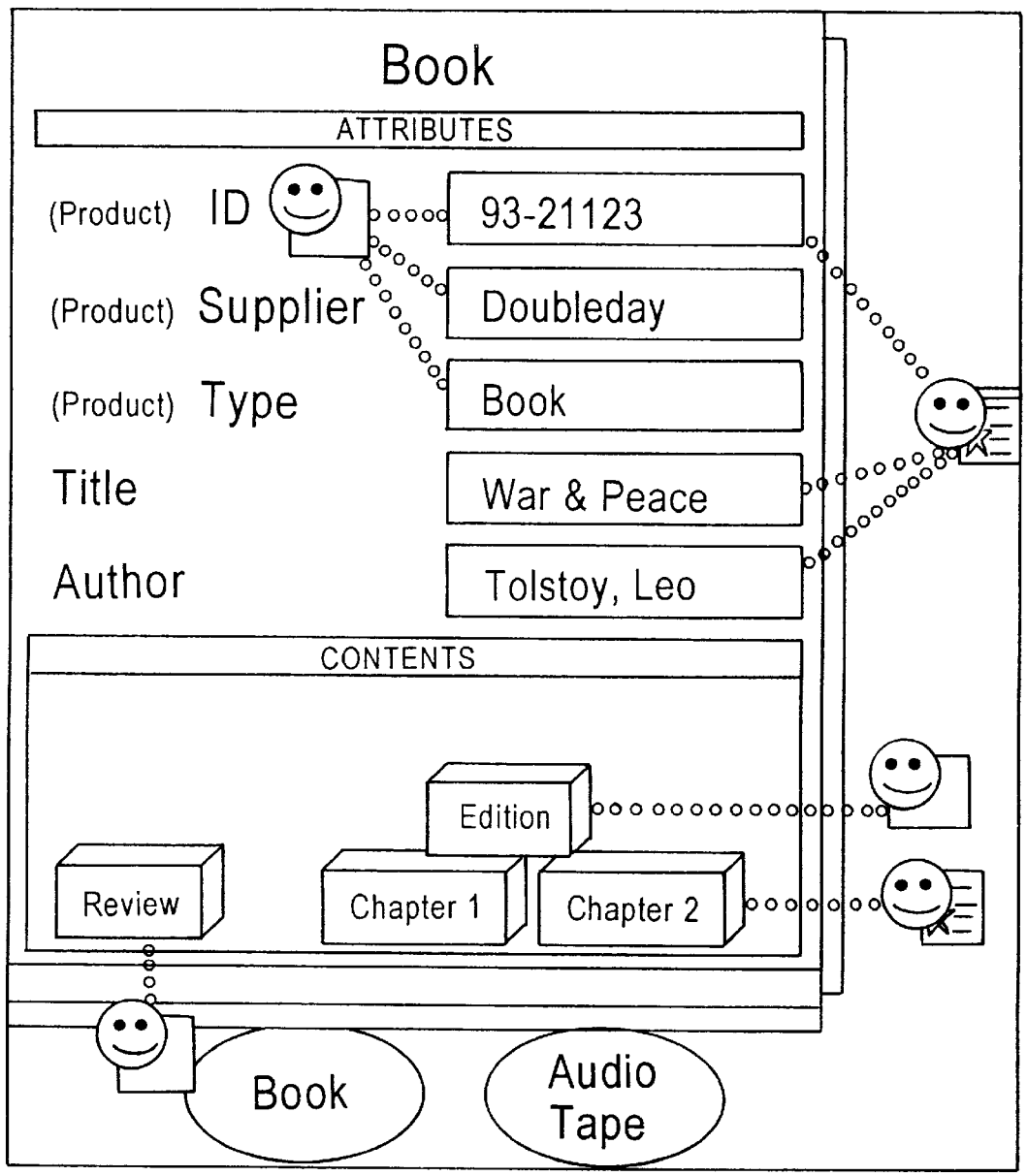
FIG. 9 illustrates an example of an entity of the class according to FIG. 8.

Each web server implementation of the present invention includes an information "metamodel" for information discovery, modeling, and visualization. A metamodel is a structured, generic model used as a framework for implementing specific information models, examples of which are illustrated in FIGS. 7, 8, 9. Referring to FIG. 3, depicted is one data structure of a general-purpose information metamodel 200 for defining and configuring the information models and visual representations stored at a server.

Information metamodel 200 is a way of generically organizing information about specific information models. Accordingly, data structures for information metamodel 200 define a set of data types, describing how classes of the information model are defined, how objects in the information model are instantiated, and how objects are displayed. According to one embodiment, the data structures for information metamodel 200 are implemented within a relational database. Each data type in the information metamodel 200 corresponds to a table in the relational database, each instance of a data type is stored as a row or "entry" in a table corresponding to the type, and the fields of each data type correspond to columns in the corresponding table. Persons of skill in the art would readily recognize that the information metamodel 200 may be implemented in a variety of ways other than with a relational database, for example, by a collection of persistent objects defined with an object-oriented language such as C++, Smalltalk, and Java, or files of records or structures of a procedural language such as C, Pascal, Ada, BASIC, FORTRAN, COBOL, PL/I, and the like.

In accordance with one embodiment, FIG. 3 shows a number of data types, each data type having a number of fields, and each field defining a certain function. Many to one relationships between the fields are indicated by interconnecting lines with an indication "∞" on the many side and "1" on the one side. For example, an instance (an object of data type Instance 215) may have many attributes 211. Accordingly, there is an indication "∞" on the many side of the Instance field 211-1 and an indication "1" on the one side of the Instance field 215-1.

Closely related data types defined by information metamodel 200 are grouped in three related layers: a data layer 210, a conceptual layer 220, and a visualization layer 230. The conceptual layer 220 acts as an intermediary between the data layer 210 and the visualization layer 230 and comprises data types that describe how information is organized within a defined information model.

CONCEPTUAL LAYER

The conceptual layer 220 comprises fields describing how data is organized within a defined model. The main part of the conceptual layer 220 is formed by the classes 225. A class 225 pertains to a model 224. The model data type enables to support multiple models and dependent models. A specific model might be composed of a plurality of dependent models. For example, a banking model might have an accounting and a lending dependent model. The model data type 224 comprises fields with the following meaning:

224-1 Model: a unique identifier, such as a number for identifying the model. For example, the banking model has number "1001", the accounting "1101" and the lending model "1102"

224-2 Name: indicates the name of the model in a human readable manner. In the example given above, this field would for example be "banking", "accounting" and "lending".

224-3 Container: If the model is a dependent model, this field contains the unique identifier of the model from which it depends. For example the "accounting" model would have in this field the unique identifier of the banking model, i.e. "1001". It should be clear that a dependent model may be dependent of a dependent model. For example, the accounting model may comprise several dependent models, which would have in this field the number "1101".

224-4 Author: indicates the name or a user ID of the person that created this model.

224-5 Origin: If this model has been imported from a data source, the address of the data source is indicated here. In case the data source has been accessed through the Internet, it would be an URL.

224-6 Date Created: indicates the creation date of the model.

Each model 224 has at least one class 225. Each class 225 is provided for defining the structure of entities to be retrieved. The class data type 225 comprises the fields:

225-1 Class: a unique identifier for identifying the class, in particular a number.

225-2 Name: identifier for the class in a format convenient for human use. In particular it is formed by a string of characters, e.g. "book" or "product".

225-3 Description: provided for enabling the operator maintaining the system to add annotation and comments for this class.

-continued 225-4 Life Span: indicates how long, for example in seconds, the entities belonging to that class should be kept in the memory of the system. For example a class in which the price of the entities is retrieved should have a relatively short life span, whereas a class from which the data is not quickly outdated may have a longer life span.
225-5 Remote server: In case a class is defined in another model and/or in a remote data source, the address of this model/data source is mentioned in this field.
225-6 Model: contains the unique model identifier 224-1 to which the class is dedicated.
225-7 Seed: indicates an Attribute Definition unique identifier, which is the attribute field 221-1 as will be described further, indicating which value is unique for each instance in the class. For example, a book may have as unique value its ISBN or ID number.

Each class can have a plurality of dependent classes or can be a dependent class from a plurality of classes. For this purpose, an Is A data type 229 is provided for defining the hierarchy, and comprises the fields:

229-1 Superclass: unique identifier of a class.
229-2 Subclass: unique identifier of a dependent class of the superclass identified in field.
229-3 Level: showing the number of intermediate classes between the superclass 229-1 and the possibly indirect subclass 229-2, wherein level 0 indicates that the superclass and subclass are equal, level 1 indicates that subclass is a direct dependent class of the superclass, level 2 indicates that there is one intermediate dependent class between the subclass 229-2 and the superclass 229-1, etc.; this multiple level architecture improves the performance of the system.
229-4 Mutative: indicating whether or not one or more turf plus patterns or agents are dedicated to the class.

Each class has a plurality of attribute definitions. The attribute definitions data type 221 comprises property definitions, with the following fields:

221-1 Attribute: unique identifier for an attribute definition, e.g. a number.
221-2 Class: identifies the class 225-1 that contains this attribute as part of its structure.
221-3 Name: an identifier of the attribute in text format
221-4 Default Class: an identifier of another class if the property contains a reference to this other class. For example a supplier attribute in a product class could refer to a supplier class.
221-5 Default Value: comprises a default value in case the property value for this attribute is not found.

One or a plurality of mutation patterns can be dedicated to each class. The mutations data type 223 comprises mutation pattern portion with one condition, for example book's pages is greater than or equal to 50. A mutation pattern may be formed by a plurality of conditions each condition being defined in a mutation pattern portion, for example book's pages is greater than or equal to 50 and price is less than $10. This data type comprises the fields:

223-1 Class; the identifier of the class 225-1 to which the mutation pattern element is dedicated
223-2 Attribute: the identifier of the attribute 221-1 on which a condition applies, for example the attribute pages.
223-3 Condition: an operator for example "greater than or equal to", "equal to", "not equal to", etc.

223-4 Value: the value to which the property value should be compared, for example 37 50".

One or a plurality of agents can be dedicated to each class. The agents data type 227 comprises the following fields:

227-1 ID: a unique machine readable identifier for the agent
227-2 Class: identifies the class to which the agent is dedicated
227-3 Sequence: a number defining sequential order of invocation of the agents for a class (optional) It defines the agent's priority. If two agents are ready to be run, the one with the greater priority has precedence. The lower the sequence, the greater the priority.
227-4 Description: an annotation for providing a human readable description of the agent
227-5 Type: specifies whether the agent is an attribute agent or a content agent. An attribute agent is provided for retrieving attributes while a content agent is provided for retrieving contents. The difference between contents and attributes is explained further when referring to the attributes and contents tables 221 and 213.
227-6 Specialty: specifies the nature of the data source the agent queries, e.g. ODBC, Web, Corba, Telnet
227-7 Time Out: indicates how long an agent should wait when the data source is not responding
227-8 Confidence: indicates how trustworthy the property values retrived from the data source (see origin 227-13)is
227-9 Local: indicates whether or not the agent is local; if an agent is local then the agent is only used for the class to which it is dedicated, not in its dependent classes
227-10 Disabled: indicates whether the agent is not to be used. This field is used for debugging and diagnostic purposes
227-11 Authoritative: if this field is yeas and if this agent receives an empty response to its request, then the entity does not exist
227-12 Mutator: indicates whether this agent is a mutation agent
227-13 Origin: indicates the data source identity, in particular the path name of the data source from which the property values are to be retrieved
227-14 Content Class: identifies the class 225-1 of the references returned by the agent, if the agent is a content agent.
227-15 Code: instruction, forming a parameterized query, to be executed when running the agent.

When an agent applies the code 227-15, data is returned comprising the requested property values. Each property value has to be extracted as a portion of the returned data. For this purpose, agent parameters are dedicated to the agent. The agent parameters data type 228 comprises the fields:

228-1 Agent identifies the agent 227-1 to which the agent parameter is dedicated.
228-2 Key is a field dependent of the specialty 227-6 of the agent; for ODBC agent, key is an index (e.g. 1, 2, 3, . . . ) assigned to each portion of data returned by a query; for Web agents, key is the identifier of the property definition to which the portion of data will be assigned
228-3 Value is a field dependent of the specialty 227-6 of the agent; for ODBC agents, value is the identifier of the property definition to which the portion of data identified by the key field will be assigned for Web agent, value is the pattern used for identifying the portion of data to be extracted and assigned to the property definition indicates by the key field 228-2
228-4 Type is a field dependent of the specialty 227-6 of the agent; for ODBC agents, this field is not used; for Web agents, type is a code indicating whether to perform pattern matching on the HTML or on the text without the HTML tags For the purpose of clarity, examples of agents with parameters is given in FIGS. 12, 13, and 14, wherein the reference numbers indicate in which field from FIG. 3 the values are stored. FIG. 12 gives an example of an attribute agent with specialty "ODBC", FIG. 13 a content agent with specialty "ODBC" and FIG. 14 an attribute agent with specialty "WEB". The fields provided below specialty are shown in function of the selected type and specialty.

VISUALIZATION LAYER

The visualization layer 230 comprising knowledge from which a predetermined presentation of an entity is selected and produced. A view is here defined as what a group of users is allowed to see; it is represented as a set of templates attached to classes. It should be noted that some classes can have no template for a given view, meaning that the user has no access to the data requested or that there is a view to be inherited from one classes from which the dependent class depends, or that a default view has been assigned.

A class view data type 233 provides a determination of a single template given a view and a class, or a single view given a template and a class or a list of classes given a template and a view. This data type comprises the fields:

233-1 Class View: identifier, e.g. a serial number, for a class view
223-2 Class: identifier of the Class 225-1 to which the class view is dedicated
223-3 View: identifier of the View 239-1 to which the class view is dedicated
223-4 Template: identifier of the Template 235-1 to which the class view is dedicated To each class view, one or more class view mappings can be dedicated. The class view mappings data type 231 holds variable substitution data. When a template is processed, for example as HTML or VRML generation, "value holders" such as "%supplier" are substituted by their values. A value holder can refer by name either to a class defined attribute, a class view mapping variable or a template variable. An attribute has precedence over a class view mapping variable which has precedence over a template variable. In other words, the value of a value holder in a template will default to the value of a template variable only as a last resort. The class view mappings data type 231 comprises the fields:

231-1 Class view: identifier of the Class View 223-1 to which the class view mapping is dedicated.
231-2 Name: the name of the variable, for example supplier.
231-3 Expansion: a value of a variable, in particular a template.

Class views are dedicated to views. The view data type 239 comprises the definition of a view. A view represents what a group of users is allowed to see. A view is a set of templates assigned to classes. Each template is retrievable from the class view table, given the view and a class. The view data type comprises the fields:

239-1 View: a unique identifier for the view.
239-2 Name: the name of the view, for example "Inventory managers"
239-3 Description: provided for holding annotations
239-4 Links: the text of a default link template for the view, which is used when no template of the type link (see 235-3) has been dedicated to a view.
239-5 Generic template: identifier of a default template 237-1 used when more than one empty is found; although the user has requested for one entity, for example one book; this can occur when there is a "conflict of opinion" as will be explained further.

239-6 Authentication: indicates the name of a user's group if the present view is restricted to particular users. A password could be requested for some particular views. This password protection of views is performed with techniques known as such.

Each class view is dedicated to a template. The templates data type 235 comprises data related for producing a presentation of an instance of a class, for example HTML, XML or VRML presentations. This data type comprises the fields:

235-1 Template: a unique identifier for a template
235-2 Name: text indicating the name of the template
235-3 Type: indicates the type of the template, for example an object template (in particular an item), a space template (in particular a page), a link template (for representing a value of an attribute, in particular a hyperlink), . . .
235-4 Specialty: determines the presentation medium, for example HTML, VRML, XML, etc.
235-5 Description: enables the manager of the system to add comments and annotations
235-6 Content: gives the actual test of the template, this embedded value holders
235-7 Extent: indicates spatial dimensions for three dimensional object or spaces for VRML presentations Each template may comprise a number of template attributes. The template attributes data type 237 comprises template variables used in value substitution, as explained with reference to the class view mappings data type 231. The template attributes data type 237 comprises the fields:

237-1 Template: identifier of the template 235-1 to which the template attributes is dedicated
237-2 Name: identifies the name of the variable.
237-3 Default value: if applicable, a default value of that variable

DATA LAYER

In order to improve response time, instances or entities retrieved by an embodiment are preferably cached. The content and attributes of instances are stored separately. This enables to cache for example the attributes of an instance and not its contents or vice versa. An instance is cached no longer than is permitted by its class's life span 235-4.

The instance data type 215 is provided for holding the instances or entities cached by the system according to the present invention. This data type comprises the fields:

215-1 Instance: identifier of an instance
215-2 Class, identifier of the class 225-1 to which the entity or instance pertains
215-3 Expiration: indicates the moment when a cached instance expires. This moment is calculated on the moment the data is retrieved plus the life span indicated in the life span field 225 -4
215-4 Agent state: is a list of agent identifiers 227-1 that were used for retrieving the cached content or attributes of an instance.

The contents data type 213 comprises the content, retrieved by means of a content agent, of cached instances. A content is a list of references to instances of a given class. The content data type 213 comprises the fields:

| | |
|---|---|
| 213-1 | Instance; identifier 215-1 of the cached instance to which the content pertains |
| 213-2 | Class: the identifier of the class 225-1 of the cached content |
| 213-3 | Seed: a value from a list of values that makes up the content of an instance, that, together with the content class, specifies an instance of that class. The content seeds form a portion of property values to be retrieved. |

The attributes data type 211 comprises the attributes, retrieved by means of a content agent, of cached instances. This data type comprises the fields:

| | |
|---|---|
| 211-1 | Instance: identifier 215-1 of the cached instance to which the content pertains |
| 213-2 | Attribute: identifier of the attribute definition 22101 to which the ached attributes pertains to |
| 213-3 | Seed: cached value or property value of the attribute. |

FIG. 7 illustrates an example of a store model having a plurality of classes: "PRODUCT", "BOOK", "AUDIO TAPE" and "BEST-SELLER". Classes "BOOK" and "AUDIO TAPE" are dependent classes from the "PRODUCT" class. A best-seller is a particular book. Therefore, the "BEST-SELLER" class depends from the class "BOOK". In case a class "VIDEO TAPE" has to be added to the store model, it can easily be added as a dependent class of the "PRODUCT" class.

Each class has a number of property definitions, in particular attribute and content definitions. Referring to FIG. 8, the "PRODUCT" class has for example the attribute definitions 221 with name 221-3 "ID", "SUPPLIER" and "TYPE", wherein ID is a unique identifier for a particular product, the supplier attribute is a reference to a supplier from the "SUPPLIER" class, and type describes the type of the product. ID and Type identify property values for simple data, e.g. numbers or strings, whereas Supplier identifies a property value referring to another entity, e.g. a Supplier entity pertaining to the Supplier class. The default class 221-4 field for this property definition will therefore be "SUPPLIER". The "BOOK" class is a dependent class from the "PRODUCT" class and inherits therefore all the property definitions from the classes from which it depends. In addition, it comprises additional property definitions, such as illustrated in FIG. 8, i.e. the attributes "Title", "Author" and the contents "EDITION", "REVIEW", "CHAPTER 1", "CHAPTER 2".

Attributes are "single-valued" in the sense that each attribute has only one value. The title of a book is a single piece of data. Content properties, on the other hand, refer to open-ended lists of or references to other entities. For example, Chapters and Reviews are content properties of a book; they list the book's chapters and reviews. Content properties can also be inherited. For example, the Sales content property of a Book could be inherited from Product.

View-based Visualization

One aspect of invention relates to a mechanism for providing multiple visualizations of the same object based on a user selected view. As explained herein before, a view is a group of related visualizations of classes. Different views can provide different visualizations for the same object.

For example, an "employee" entity may be visualized in association with information about salary, health benefits, and a retirement plan in a "Personnel" view, but the same employee object may be visualized in association with information about the employee's e-mail address, computer model, and word processor type in an "MIS" view. Thus, human resources administrators and MIS administrators would only see the information that is relevant for their tasks, because they interact with the system through different views, designed for their tasks.

A user initiates a session with the server by specifying the name of a class, a seed, and the name of a view. For example, a personnel director may wish to look up information about an employee having an SSN of 999-99-9999. In this case, the personnel director would input a class name "Employee," a seed "999-99-9999," and a view name "Personnel." According to one embodiment, a browser that the personnel director is using may display a form collecting that information and submit to a server (e.g. at www.server.com) a query having a such as:

http://www.server.com/query.pl?Employee=999-99-9999& View=Personnel

Figure 4:
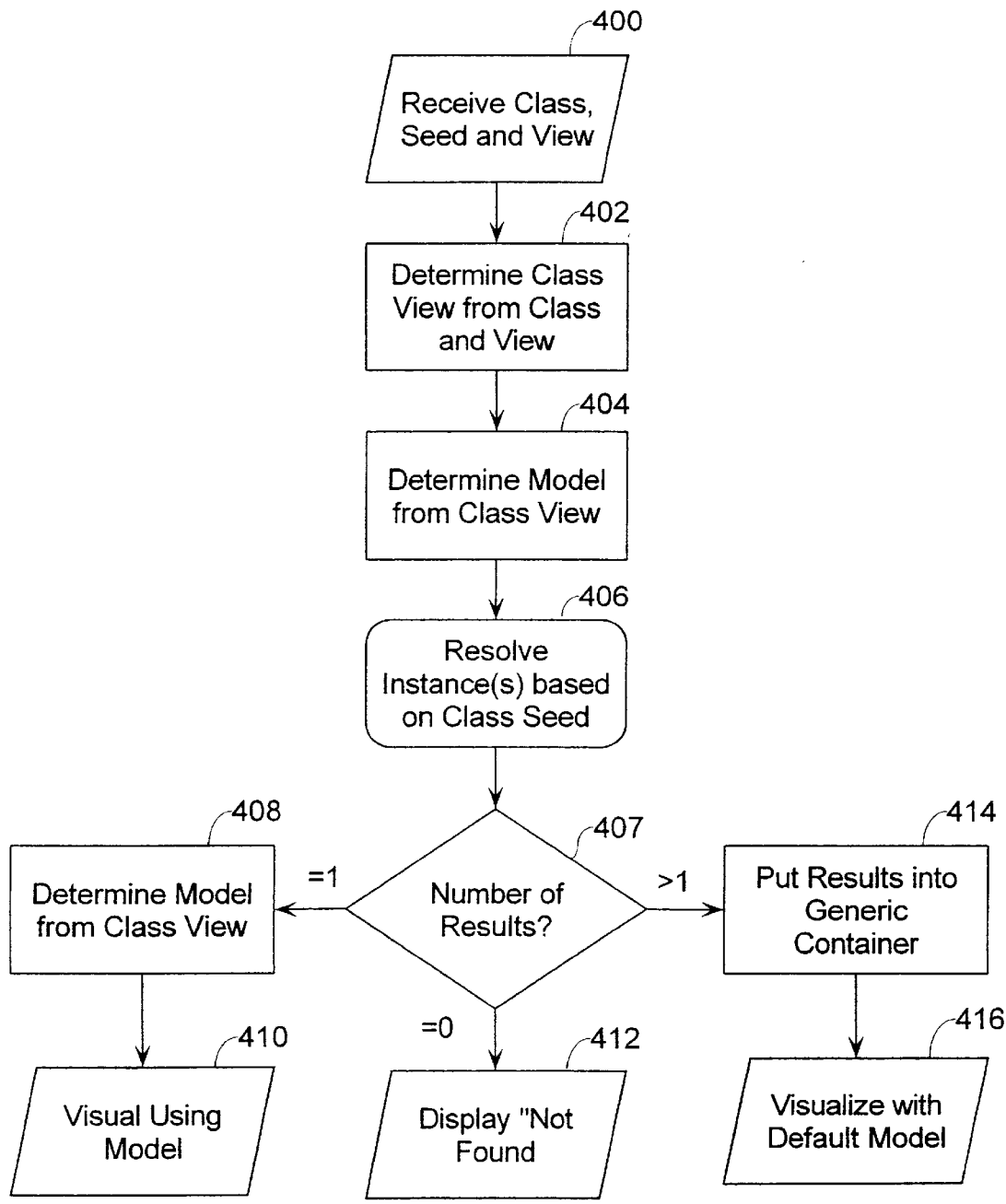
FIG. 4 is a flowchart illustrating an operation of discovering, integrating, and visualizing information according to an embodiment.

Referring to the flowchart of FIG. 4, in step 400 the server receives a query containing a name of a class (e.g. "Employee"), a seed for the class (e.g. "999-99-9999), and a name for a view (e.g. "Personnel").

At step 402 the server determines a class view based on the class name and the view name that have been input. In particular, the server scans the "Classes" table 225 to find an entry with the input class name (e.g. "Employee") in the "Name" field 225-2 to determine the class identifier in the "Class" field 225-1. Likewise, the server scans the "Views" table 239 to find an entry with the input view name (e.g. "Personnel") in the "Name" field 239-2 to determine the view identifier in the "View" field 239-1. Thereupon the "Class Views" table 233 is scanned for an entry of a class view in which the "Class" field 233-2 contains the class identifier and the "View" field 233-3 contains the view identifier.

The entry for the identified class view contains an identifier for a visualization model in the "Template" field 233-4. This identifier is used to fetch an entry from the "Templates" table 235 (step 404), in which the "Type" field 235-3 is inspected to see if the model is a space. If the template is indeed a space, then one or more underlying instances for the template are resolved (step 406) from the input class name and the input seed, as described in more detail hereinafter.

At step 407, the number of entities that are returned is compared. If instance resolution does not result in the instantiation of any instance, i.e. no results, then a message indicating this situation, e.g. "not found" is output to the user (step 412). If instance resolution results in the instantiation of a plurality of instances, for example, when the seed value is not unique, then the results are placed in a generic container (step 414). In this situation, the model specified by a model identifier in the "Generic Template" field 239-5 of the view (step 414) is used for visualization in place of the model of an individual instance (step 416).

In step 406, when instance resolution results in one entity, the model attributes are mapped to attributes of the class of the underlying instance via "Class View Mappings" table 231 to determine the values of the template attributes. In particular, the template identifier, originally determined from the "Template" field 233-4 of the class view entry in the "Class Views" table 233 is used to fetch entries in the "Template Attributes" table 237. The name of each template attribute, derived from the "Name" field 237-2, and a class view identifier from the "View" field 233-1 is used to fetch a class view mapping entry in the "Class View Mappings" table 231. If no such entry is found in the "Class View Mappings" table 231, then the value in the "Default Value" field 237-3 is used.

On the other hand, if there is an entry in the "Class View Mappings" table 231 for the model attribute and the class view, then the string expansion specified in the "Expansion" field 231-3 is performed. More specifically, the expansion generally results in a string containing the name of an instance attribute. The instance attribute name is used for fetching the attribute value of the instance from the "Attributes" table 211 in the data layer 210, in conjunction with the instance identifier of the underlying instance. If the result of the expansion includes an object having a spatial visualization, then the value is expanded as a link, such as URL, by means of the "Links" field 239-4 of the entry for the current view in the "Views" table 239.

Determining the class of the attribute value involves examining the "Type" field 235-3 for the template of the value's class within the current view in the "Class Views" 233 table. If the attribute value is an unresolved instance or a scalar, then the default value of the attribute in the "Seed" field 225-7 is used. Instances of remote classes, defined and stored at another server, are visualized as a link with a URL specifying the network address of the remote server, stored in the "Remote Server" field 225-5. Activating that link allows the object stored at the remote server to be visualized.

In step 410, the underlying entity is visualized. Since the underlying entity has a space visualization, the server will iterate through the contents of the entity (i.e., by fetching entries from the "Contents" table 213) and collect any item belonging to a class that has an object visualization (cf. "Type" field 235-3) in the current view. In one embodiment, when the number of content items exceed a predefined threshold, hit analysis is performed of the contents for automatically classifying the contents according to various criteria and categories, as explained in more detail hereinafter.

Content items are handled by recursively mapping model attributes for the content items and expanding corresponding visualization templates, in the "Content" field 235-6 of the template for the class of the content item for the current view. The expanded templates are concatenated to a special "Contents" parameter of the space model.

When all the values of the model attributes and contents have been determined, the template for the model in the "Content" field 235-5 is expanded and sent to the client browser for rendering. A visualization template may specify, for example, hypertext markup (e.g. in HTML) or 3D markup (e.g. in VRML).

Visualization templates may include slots for variable expansion, for example in one embodiment, of the form "$x", "%x", and "@x", where "x" is a name of a variable. If there is not an attribute for the underlying instance with that same name, i.e. "x" in this example, or if the attribute with that name does not have a value, then the default value of the model attribute, from "Default Value" field 237-3 is used as a current value. On the other hand, if there is an attribute with the same name, i.e. "x" in this example, then a current value for the expansion is the value of the attribute with the same name.

If there is a class view mapping with the same name, specified in the "Name" field 231-2 of the "Class View Mappings" table 231 for the current class view ("Class View" field 331-1), then the template in the "Expansion" field 231-3 is expanded recursively, using the current value. A "%x" slot is replaced by the current value as is. A "$x" expansion slot is replaced by the current value using the HTML character set encoding and models of a spatial value are expanded as a link in the current view showing the current value. A "@x" expansion slot is replaced by the current value using a restricted character set encoding for URLs.

When an attribute is expanded as a link, the user may activate the link as a browsing command, causing the instance associated with the attribute to be visualized by re-executing steps 402 through 408. Activating links to a remote server cause the remote server to perform steps 402 through 408 for the remote object. In this manner, it is possible for the user to stay in information discovery mode, or search mode, throughout browsing, because accessing each link yields new visualizations of new objects by the server. Thus, the user never really leaves the web site of the server and continues to view the visualizations during the browsing process.

In the example, if instead the employee object was viewed in an "MIS" view, then a different set of models for the employee object and attributes is determined through the "Class Views" table 233. By the class view mechanism, the same object can be visualized in different ways depending on the view being employed. Thus, views may be tailored for outputting relevant information of an object for specific purposes, while not outputting irrelevant information (e.g., an employee's salary for an MIS director). Some views may require user authentication (e.g. password protection) for implementing security and controlling access to information.

In addition, the use of views to specify models with expandable templates allows a "virtual web" within a configurable information model to be presented to a user in various kinds of visualizations. For example, a space may be visualized in one view as a standard web page, using templates written with hypertext markup, e.g. in HTML, HTML+, HTML 3.0, etc. As another example, the same space, but through another view, may be visualized as three dimensional worlds, using templates written with virtual reality modeling, e.g. in VRML. In a 3D world, companies may be shown as buildings and employees as "avatars." In fact, the user can be enabled to switch from one view to another, allowing to the user to decide and choose which representation is more effective for exploration.

FIG. 9 illustrates an example of a book entity having the following property values: "93-21123" as ID, "Doubleday" as Supplier, "Book" as Type, "War & Peace" as Title and "Tolstoy, Leo" as Author. The content properties refer to other entities. This entity is found by the system according to the invention after the user has input a request, for example:

http://www.server.com/query.pl?Product=93-21123&View=Customer

For such a query, it is assumed that a product can most appropriately be retrieved based on its ID number. In this case, the seed field 225-7 would indicate the unique identifier of the attribute definition for ID number. The search possibilities could be enhanced by permitting to indicate in a query any property value pertaining to a class. The request would have then for example the following format:

http://www.server.com/query.pl?Product.ID=93-21123&View=Customer

Interface 111 receives this query and supplies it to the processor 104 of the system. The processor will select from the memory the "Product" class, since the user has keyed in Product as particular class. In response, data for the Product entity, identified by the product ID, is retrieved, in one embodiment, by invoking agents as described in more detail hereinafter. The retrieved data is stored in the memory and visualized for to the user according to the specified view.

In this example, the user has input in its query: "View= Customer", wherein all the found properties, except the supplier would be shown to the user. Another view could for example be a view for the staff, which view would require a password and provide in addition to the property values mentioned (including the supplier property value) an indication of the stock of the product in the store. An additional agent or above mentioned agent provided for retrieving the supplier and the type would be configured for retrieving in the internal database of the store, the numbers in stock of the requested product.

Based on the requested view, corresponding to view name 239-2, and the requested class corresponding to class name 225-2, a dedicated class view 233 is determined, having a dedicated template 233-4. The content field 235-6 of the template table 235 will supply the instructions for producing the requested view to a user.

In general, once an entity has been recovered from the data sources, it can be shown to the user who requested it. How the entity is shown and how much of it is shown depends on the template that's used to generate the presentation. Each template is dedicated to a class. A dependent class can inherit presentations from its classes from which it depends or can define its own templates.

There are different kinds of templates, including: (1) a page template to display an entity as a full page, for example, a Book page will show the book's title, author, price, availability etc.; (2) an object template to display a summary of an entity in the page of another related entity, for example, a Book page would also show a list of its Reviews, each one summarized as a few lines and displayed using their object template; and (3) a link template to display an attribute value, in particular a hyperlink to an entity, for example, the summary of a Review listed in a Book page would include a hyperlink to the Review page where the full review can be read.

A user display, in particular a web page, is constructed on the fly from the templates. Each template can be a parameterized web page or VRML scene or other presentation to a user. The blanks are filled by the values of the entity's attributes and content properties before display. When the value filling a "blank" is a reference to another entity, then a hyperlink to that entity is automatically inserted. Hyperlinks are thus always correct and current, reflecting the data in the data sources at the time of the request.

If no template for a view on a class is defined (or inherited) for a given group of users, then no user belonging to that group can see entities of that class. For example, there would be no views defined on the class Inventory for customers, meaning that customers could not peruse the Inventory. If an attribute of a class is not shown in a template for a given group, then no member of that group can see the value of that attribute. For example, the views for class Employee would include the Salary attribute only for the Manager group (meaning that only managers can see employee salaries).

Between the moment an user requests to view an entity and the moment that entity is viewed for example as a Web page or a VRML scene or other presentation, a lot can happen as the relevant agents access data sources, triggering further agents until eventually all activated agents are done. Instead of waiting for all agents to have completed before displaying a Web page, a more dynamic approach may preferably be applied, a technique which is known as "server push", showing a Web page as soon as some data is available about the requested entity and then refreshing the page automatically when new data is retrieved. In particular, when mutation is applied as described herein after, the user will first see data relating to the requested class and upon refreshing, the user will also see the additional property values. This way, the user does not have to wait too long to get a feedback and may elect to follow a hyperlink before the entity is completely shown and while the incomplete page is waiting to be refreshed with additional property values.

In a preferred embodiment, there is first checked which view is requested by the user and determined which properties should be supplied to the user. Based on this determination, only the agents required for the requested view are triggered, in order to supply more quickly the requested data to the user.

Agent-based Entity Retrieval

Another aspect of the invention relates to dynamic data integration from a variety of data sources, for example, databases, files, documents, and web servers located at various site on a network. The data collection is performed on demand by users as their needs arise. The retrieved information may be cached in the data layer 210 for a period of time according to the server's configuration.

In one embodiment of the invention, dynamic data collection and integration arc performed during retrieval of an entity by invoking one or more agents. These agents, which comprise executable instructions, encapsulate knowledge about a particular data source, e.g. formatting information, relevant to a particular kind of object stored at the server. For example, an agent invoked for an instance of an "employee" class may query a relational database located at a company's headquarters. As another example, an agent responsible for collecting and integration about an instance of an "author" class may check a web-server for email addresses to discover a living author's email address. Other examples of data sources include web pages, search engines, text files, operating system files, SEC filings and reports, and the like.

Figure 5:
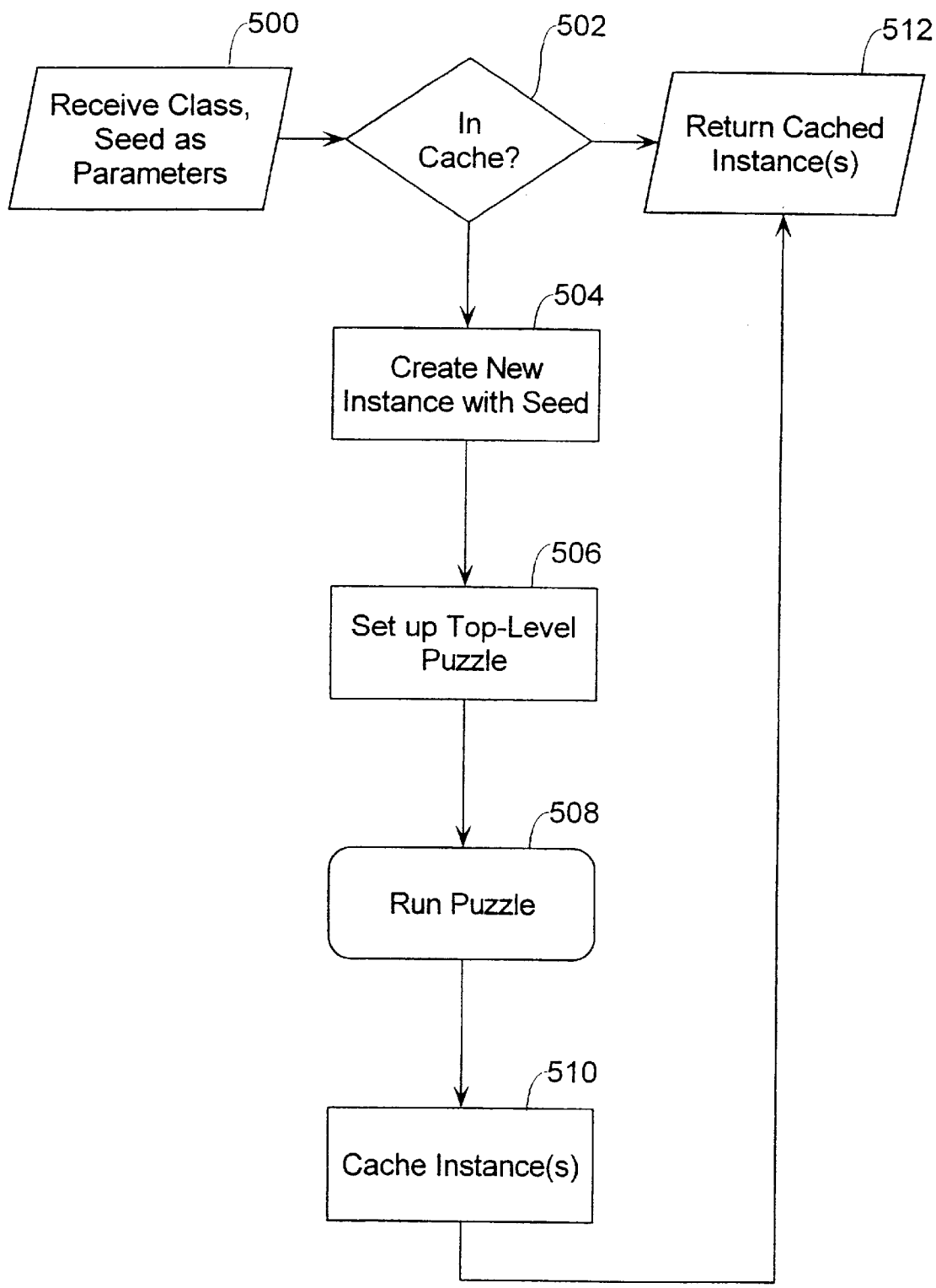
FIG. 5 is a flowchart illustrating an operation of data discovery and integration according to an embodiment.

Referring to the flowchart in FIG. 5, entity resolution uses a class and a seed as parameters (step 500). The class parameter is an identifier which can be used for selecting a single entry from the "Classes" table 225, which describes a body of data, i.e. an instance of the class, having attributes and contents. A seed is a value for an attribute of the object that is used for gathering information about the object. For example, a good seed for an "employee" object is an employee number, such as a social security number, because it uniquely identifies the employee and is a commonly used index in many authoritative databases.

In step 502, the data layer, which stores entities as instances of classes, is checked to see if an instance that is a member of the class or subclass that has a seed attribute (e.g. as indicated by "Seed" field 225-6) with the value of the seed parameter. If such an instance is found, the instance identifier (stored in the "Instance" field 215-1) is returned in step 512. In addition, an identifier of the actual class of the instance (in the "Class" field 215-2) is also returned, because an instance with that seed value may be a member of a subclass, specified in the "Is A" table 229. For example, the server may be configured to discover information about "employee" objects. The corresponding "employee" class may have two subclasses, "exempt" and "nonexempt," for payroll purposes. When an "employee" instance is resolved, the actual class of the instance is one of the two subclass, "exempt" or "nonexempt."

On the other hand, if such an instance is not cached in the data layer 210, then the instance is instantiated in step 504 with attributes initialized from the seed parameter and the default values in the attribute description, e.g. in the 231-5 field. Instantiation results in the creation of a new entry in the "Instances" table 215 with a unique instance identifier being stored in the "Instance" field 215-1. In addition, the "Agent Seed" field 215-5 is initialized to the seed parameter and the "Agent State" field 215-4 is cleared.

In step 506, a "puzzle" is set up that determines which agents are to be invoked for gathering information for the new instance. These agents may be agents specified for the class identified by the class parameter ("class agents") and non-local agents of superclasses of the class ("non-local superclass agents"). In one embodiment, agents are listed in respective entries of the "Agents" table 227. Class agents are determined from entries in which the class identifier in the "Class" field 227-2 matches the class parameter received in step 500. Non-local superclass agents are determined from entries in which the "Local" field 227-9 is false and the class identifier in the "Class" field 227-2 matches the class identifier specified in the "Superclass" field 229-1 of the "Is A" table 229 wherein the corresponding "Subclass" field 229-2 contains the class identifier matching the input class parameter.

As described in more detail hereinafter, the puzzle is run, invoking agent to gather data and then integrating the data into one or more entities (step 508). If successful, the one or more entities are cached in the data layer 210 (step 510), setting the "Expiration" field 215-3, as appropriate. For example, the "Expiration" field 215-3 may contain the termination date of a mortal object (cf. the "Life Span" field 225-4). When a mortal object has expired, it is removed from the data layer 210. Finally, the instance identifier and the actual class, possibly changed due to a mutation, of the instance is returned in step 512.

Since agents are invoked when an instance is resolved, information that is potentially more up-to-date can be retrieved than through conventional search engines. Conventional search engines pre-traverse the web to build their index files, which may become out of date for months until the search index is re-updated. With the present invention, however, the "Life Span" attribute controls how long any information object is cached, reducing the obsolescence of information stored at the server to individually acceptable levels, e.g. caching for only a month.

Invoking Agents

Figure 6:
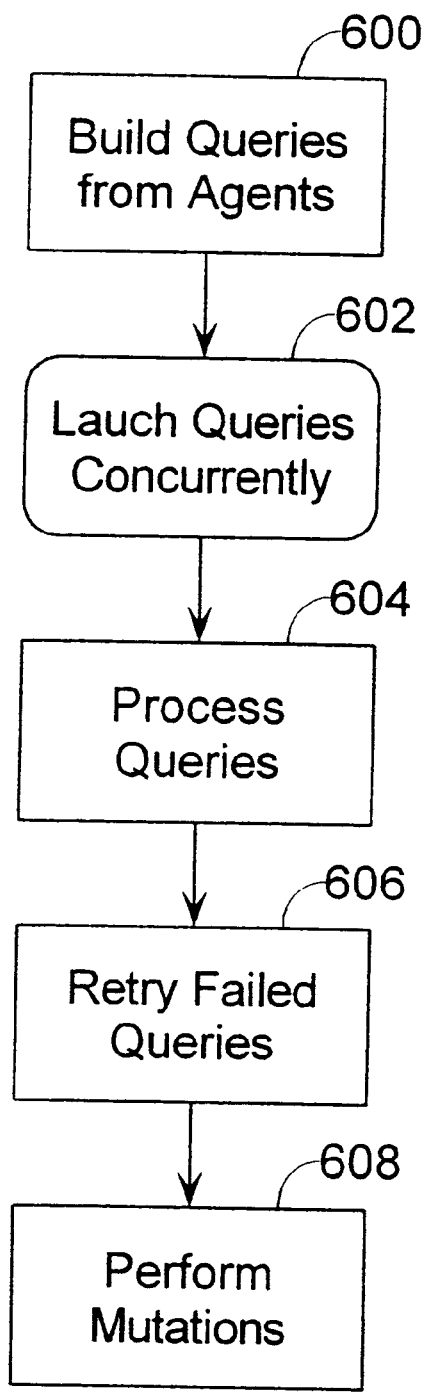
FIG. 6 is a flowchart illustrating an operation of concurrently launching queries to discover information according to an embodiment.

Referring to FIG. 6, running a puzzle results in invoking agents to dynamically access, collect, and integrate "pieces" of data from data sources. More specifically, the agents associated with the class (and superclasses) of the entity to be retrieved are examined. In step 600, queries are built as a combination of an agent and a "pieece" of information as an input parameter, typically a previously determined attribute for the entity to be retrieved such as a seed value. For example, an agent may get additional information about a person based on a social security number. Given the social security number, a query is created in conjunction with the agent, using the social security number as an input parameter.

On systems that support multi-tasking, all the built queries are launched concurrently at step 602. Launching a query involves invoking (or executing) an agent with the corresponding piece of information as an input value. The result of launching a query is a result code and, if appropriate, a list of pieces. The result codes are REFRESH_AND_CONTINUE, REFRESH_AND_QUIT, FAIL_AND_CONTINUE, and FAIL_AND_QUIT. "REFRESH" means that the query was successful, while "FAIL" means that the query was unsuccessful (e.g. time out or not found in the data source). "CONTINUE" means that the result is incomplete and "QUIT" means that the query result is controlling, whether successful or unsuccessful. A piece is an attribute, value pair, such as "Name='Bob Smith'".

Generally, agents come in two flavors, attribute agents and content agents, specified in the "Type" field 227-5 of the "Agents" table 227. An attribute agent is responsible for gathering information about an instance itself, for example, getting the author of a document, the size of the document, and creation date. Attribute agents are normally invoked during instance resolution, which takes place the first time the value of an attribute is requested. In the example, the agent that discovered the length of employment for an employee from an authoritative database is an attribute agent.

Content agents are responsible for gathering the content of the object, for example, getting files in a directory, graphics from a web page, or names from a telephone book. Content agents are invoked whenever content of the object is first accessed, usually when producing a visualization for the object's space. In the example, the agent that discovered files in a directory is a content agent.

To support concurrent query execution, queries use a common "blackboard" to post their results. When a query is launched, the blackboard is first checked for an entry listing the agent and piece. If the entity is incomplete, because another query is currently running, then the query waits until the result from the running query is available and returns the result posted on the blackboard. On the other hand, if there is not entry for the agent and piece, then such an entry in the blackboard is created, the agent is invoked, and the results are posted on to the blackboard and returned.

When an agent is invoked, it is passed an instance identifier for accessing and modifying attributes of the instance being resolved and the input seed value. For example, if the instance is a member of a "employee" class and the seed value is an employee number, the agent is passed an identifier of the instance and the employee number. The agent may use the employee number to query an authoritative database (cf. the "Authoritative" field 227-11), parse the result to determine some values of attributes (such as length of employment), and initialize the attributes with the parsed values. As another example, a "directory" object may use a pathname as a seed value. The contents, e.g. files and other directories, of a directory having that pathname may be inspected by the agent for creating file objects as contents of the directory object.

At step 604, the results of launching the queries are processed as they come in. If the query failed to run due to a timeout condition (e.g. with a result code of FAIL_AND_CONTINUE), then the query is placed on a failed queries list. If the query has failed and the agent is considered to be authoritative (result code of FAIL_AND_QUIT), then all remaining agents are marked as done and the search for this puzzle is terminated. If the query has failed, but not due to a time-out (also FAIL_AND_CONTINUE), then the agent is simply marked as done, but the other, concurrently invoked agents are allowed to continue. Results of a content query are added to the content of the current result. Attribute queries, on the other hand, add their results to the attributes of the current result. Failed queries are retried in step 606.

In the example illustrated in FIG. 9, an agent dedicated to the Product class, is provided for retrieving the Supplier and Type property values based on the ID number. These property values are for example stored in an internal data source, for example a relational database 246. The agent comprises an address in field Origin 227-13 indicating the path name of the database 246 data source. In order to enable to retrieve data from different types of data sources, there are provided different types of agents. For a relational database such as Oracle ®, the agent is an ODBC agent type. The agent further comprises a series of instructions indicating which data from the addressed data source are to be retrieved by the agent, for example:

"SELECT Key, Type, Supplier FROM Products"

The agent further comprises in its agent parameters 228 for assigning, for each property value to be retrieved, a portion of the data to one of the property definitions. In this case, "Key" is assigned to "ID" property definition, "Type" to "Type" property definition and "Supplier" to "Supplier" property definition.

This agent co-operates with interface 111 for accessing the data source, under control of processor 104 and for retrieving the requested data. In the example mentioned hereinabove, the following data will be returned: "93-21123" forming the ID, "Doubleday" forming the Supplier and "Book" forming the type.

Data Integration

When several agents retrieve, from different data sources, property values that should correspond, some property values retrieve might not be equal to each other. For example, a customer's telephone number may be recorded differently in two data sources, or there might be three different authors for the same book title. In the first case, it is probable that the same customer has two phone numbers (an inconsistency), in the second case, we may be dealing with three altogether different books (an ambiguity).

Inconsistencies and ambiguities are virtually unavoidable when integrating multiple data sources that were not conceived together and that may not even be managed by the same organization. There is therefore a need for appropriately handling ambiguities and inconsistencies within data. The manner in which an embodiment handles these problems is explained by means of an example.

Figure 10:
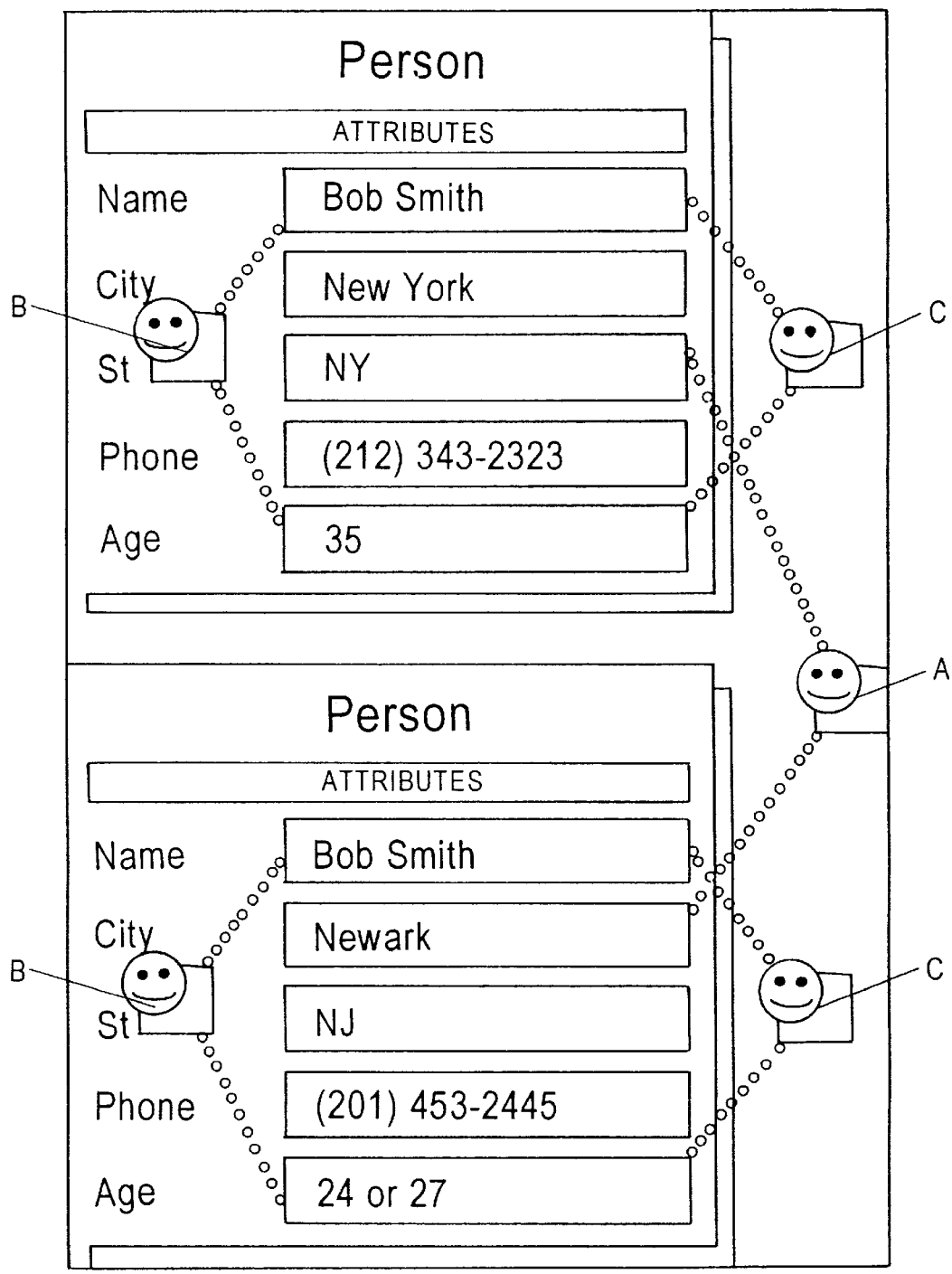
FIG. 10 illustrates an example of agents returning inconsistent and ambiguous property values.

Assume that agents are looking for a Person named Bob Smith. Agent A is configured to look for a person's address given the person's name. Agents B and C are configured to look for a person' age given the person's name, each agent targeting a separate data source. This example is illustrated in FIG. 10.

Agent A returns with not one but two "Bob Smith", one living in New York and the other in Newark. Determining whether there are two persons named Bob Smith or only one with a conflicting address depends on how much to trust Agent A to be accurate or, in other words, whether its data source contains the correct addresses. For this purpose, a reliability or confidence parameter 227-8 is assigned to the agent. If the confidence parameter for agent A is 100%, then there are two persons named Bob Smith and two entities are thus shown to the user. On the other hand, if Agent A has a confidence parameter of only 10%, then the one entity is produced, showing two possibilities for a property value, e.g. "New York OR Newark".

Assume now agent A has a 100% reliability parameter. Agent B and C for the Bob Smith in New York obtain his age. Both agree that it is 35. However agents B and C for the Bob Smith in Newark disagree about his age. Agent B indicates 24 and Agent C 27. In this case, Agents B and C are fallible, but their disagreement is not sufficient grounds to see two separate persons named Bob Smith living in Newark. If Agents B and C have substantially the same reliability parameter that is relatively low, for example 10%, then one entity will be presented to the user with an indication of two property values for the age: "24 OR 27", such as illustrated in FIG. 10. In this situation, there is a "conflict of opinion" between data sources about the age the Bob Smith living in Newark. Because of ambiguities and inconsistencies, a request to an embodiment to find an entity may end up returning more than one entity, with some "conflicts of opinion" about some of them. When this occurs, the user is presented with a display using the generic template 239-5 for the requested view, e.g. a Web page, that gives a choice between these entities and highlights conflicts.

If Agents B and C have substantially the same reliability parameter, which is relatively high, for example 90%, then on embodiment interprets that there are two distinct entities as being two separate entities which will be presented to the user, each with its own age. If agent B is substantially more reliable than agent C, for example agent B is at least 25% more reliable than agent C, then an embodiment will prefer the property value retrieved by agent B, i.e. 24, and only the entity retrieved having this value will be presented to the user.

Consequently, providing a reliability parameter for agents, inconsistencies and ambiguities in property values can be interpreted, filtering out unreliable property values or presenting them in an appropriate fashion to the user.

When it is determined that two or more entities are to be created, for example two persons named Bob Smith, instances are created for each new entity. For each new entity, a new corresponding sub-puzzle is set up and then run. At this point, the top-level puzzle switches to a passive mode in which the top-level puzzle waits for all the sub-puzzles to finish and return their results recursively.

Mutations

Sometimes, information discovered for an entity, typically by an attribute agent, causes the entity to change its class. Accordingly, the entity is checked if a mutation should be performed to change the class of the entity (step 608). In a particular check, mutation patterns or mutation agents dedicated to one of the dependent classes of the current entity are checked. This checking can be performed by verifying, for each dependent class, if the mutative field 229-4 is true. If true, then mutation patterns or mutation agents dedicated to the classes "Book" and "Audio Tape" are examined. A mutation pattern dedicated to the classes book comprises a condition, for example: "If the Product Type ="book" then mutate the Product into a Book", which is evaluated to determine if the found property value for the product type falls within the condition. For this purpose, the processor 102 compares the property values stored in the memory 104 with the condition of the mutation pattern. In the example, the retrieved property for the product type is a "Book". Thus, a mutation occurs and the class of the entity becomes "Book" causing additional property values pertaining to the class "Book" to be retrieved. A mutation agent is a stored procedure or other piece of procedural logic that can be called to performs more complex mutation than are supportable by a mutation condition.

In particular, retrieving the additional property values is again performed by one or several agents dedicated to this class. For example, an agent may be provided for retrieving a book's author and title from a web site given the book's ID. Since the data will be retrieved from a web site, the agent type is in this case "Web". The address in the Origin field is in this case an URL of the web site where the data should be retrieved, the instructions form in this example steps required for accessing a web page where the requested data is shown. This is performed by providing the ID number "93-21123" and assigning this number to a corresponding parameter on the web site, for example LCCN Number. The agent uses agent parameters, by means of which pattern matching is performed, wherein the property values are extracted from web content by applying regular expressions. For example, the title property value could be found by searching on the page the expression "TITLE:" and looking for a series of words after the expression and located between spaces. This technique is particularly applicable to all web pages having a predetermined structured presentation of the data. The ID is for example mentioned after the expression "LCCN NUMBER:" and the author after the expression "Author/Other Name:". In the example given, the following additional property values are retrieved by the system: "War & Peace" as title and "Tolstoy, Leo" as author.

Another agent could, for example, be provided for finding chapters of a book in a Telnet site given the book's ID. Yet another agent could be provided for accessing a relational database where book reviews are gathered from multiple sources, given a book's title and author. It should also be clear that the agents dedicated to a class to which the dependent class is hierarchically linked are also used. In this case, agents dedicated to the class products have already been processed, since book is a particular product and the user input the class "product" in his query. Now, the system has retrieved additional data, i.e. additional property values such as the title of the book, the author, reviews and chapters. This additional data is supplied to the user, although a high-level Product was requested. The answer to the request of the user is automatically completed by the system according to the present invention with additional data which was unexpected by the user.

Referring to FIG. 7, depicted is a dependent class "Best-seller" dependent from the class "Book". If the product requested by the user has been determined to be a book, an embodiment further verifies if the found entity should not further be mutated to the class "Best-seller". A mutation agent, i.e. an agent the mutator field 227-12 of which indicating that the agent is a mutation agent, which agent is dedicated to the class "Best-seller" is, for example, configured to access an external database or web site comprising a best-seller list. Based on, for example, the book's title and the author, the mutator agent will search in the addressed data source for the requested data. If the agent finds the requested book in the database, this means that the entity is a best-seller and the found entity is mutated to the class "Best-seller" as explained hereinabove. On the other hand, if the requested entity is not present in the best-seller data source, for example the agent receives a message such as "Could not be located", the book is not a best-seller and therefore a mutation is performed.

The example of the mutation pattern described hereinabove had a single value condition with an operator "equal to". In general, however, all types of conditions are conceivable, with all types of operators such as "larger than", "between . . . and . . . ". A list of single values is also conceivable. A mutation pattern could also have a defaulting condition "If all the other mutation patterns from the same level fail, then mutate to this dependent class". Such a mutation pattern signifies that the class to which the dependent classes of that level are hierarchically linked, is an abstract class, i.e. a class for which comprise no entities or instances. In the example given, if the store only sells books and audio tapes, the product class could then be an abstract class, since every entity is either a book or an audio tape. The mutation pattern for audio tape would be "If product type is not a book then mutate to audio tape class".

By invoking specialized agents associated with each object, knowledge about information discovery is distributed among the objects themselves. Each object, via the agent information discovery mechanism, "knows" how to find more information about itself, i.e. where to look and how to interpret was is found there. As a result, search strategies can be stored and automated for collecting and organizing related information from a diversity of data sources, even when located at different sites in a computer network, e.g. the Internet, or encoded in different, incompatible formats. Thus, the present invention enhances the usefulness and efficiency of information discovery for users who co-ordinate information at work or browse the web at home.

In the process of information discovery, an object of one class may become an object of another class, causing an entire new set of agents to be invoked. For example, an agent for a "company" object might discover that the object is a publicly-owned company with an additional set of agents to search for financial reports. Consequently, an embodiment of the present invention fosters an opportunistic and serendipitous information discovery process.

Automatic Content Classifaction

In the course of information discovery it is possible for the web server to find a large number of content items in response to a query from a user. For example, queries supplied to the system may lead in a large number of entities to be retrieved and presented to the user. With known systems, the user would be confronted with long lists of results, in particular hyperlinks, to scroll through. Accordingly, one embodiment of the present invention relates to supplying the results of a query input by the user in a more structured manner, by performing automatic content classification of an object's content items for visualization. Automatic classification places each item into a particular bin for each of several possible classification criteria. In this manner, the web server automatically performs a "hit analysis" of the query results so that the user can more easily ascertain by browsing to a relevant bin for items that are most relevant to the user.

Figure 11:
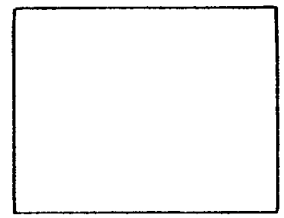
FIG. 11 illustrates a display supplied to the user when a relatively large number of entities are retrieved by the system according to the present invention.

One embodiment takes advantage of the fact that the retrieved entities are dedicated to a structured model and thus that it has some understanding of entities. It is thus possible to organize long lists of entities. All entities belong to a class with defined properties. Using that knowledge, the embodiment takes a long list and splits into smaller lists. Each smaller list represents entities falling within some range for a property value. For example, for a big list of Employees, the system could break the list down according to employee ID. A first sub-list would contain references to employees with IDs less than 236 and the other smaller list would contain references to employees with IDs greater than 342. This example is illustrated in FIG. 11.

Since there is more than one property definition that can be used to create smaller lists, the system offers alternate subdivisions of the oversized content. This is in particular performed for each of the property values that may be viewed by the user. As illustrated in FIG. 11, smaller lists are created for the first name, last name, city and state.

If the smaller sub-list is still too large for comfort, the system applies the same operation again on the sub-list, until the user reaches a list small enough to be laid out in full. This is performed automatically for example by assigning to the system a predetermined maximum number of entities that the sub-list may not be exceeded.

Sometimes the amount of data that would be returned by an agent is so large that the system can only accept some of it from the data source and must discard the rest. For example, an agent could return a million references to Customers. The manageable portion that is accepted by the system is displayed using the same technique. As the user accesses restricted subsets of the original list, a more specific query is sent, yielding a smaller number of references. If the smaller number, for example 100,000, is still be too large, then this technique is reapplied. Eventually though, when the user has navigated to a narrow enough subset, the highly constrained query will return a complete yet manageable set of answers which can all be accepted and displayed by the system according to the present invention.

Consequently, such a subdivision of the results or automatic content classification provides a logical structure of the retrieved entities to the user, wherein the user can select a range. It should be noted that this provision could also be applied in other systems, in particular in systems without mutation, and in general to any displaying system for displaying large sets of data.

In summary, when a user supplies a query to the user, the following steps are performed, according to a preferred embodiment of the present invention:

The query is received by the interface and supplied to the processor.

If required, the user is asked to enter a user ID and a password for authentication, in particular when the requested view is a password protected view.

The query is processed by the system.

A plurality of data sources, addressed by the agents, are accessed to retrieve data pertaining to the requested entities, which data is mapped into property values as defined in the agent parameters of the agent.

The found entities are presented to the user according using templates dedicated to the requested view. In particular, this step may be performed before the previous step has been finished, in such a manner that the page presented to the user is dynamically updated when more property values are retrieved. If the number of results is too large, then the list of results is subdivided in smaller list indexed according to several property values and presented to the user. The user may select one of these smaller lists.

Meanwhile, there is checked if mutation of each found entity should occur, using mutation patterns and mutation agents. If mutation occurs, additional property values are retrieved and presented to the user, by dynamically updating the users screen.

A new query may be input by the user to the system, in particular by selecting a link in the presentation supplied to the user.

Accordingly, the manner in which data is extracted from data sources, integrated into a model and presented to the user is improved, in particular when the data has to be retrieved from a plurality of data sources which may have different formats.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An entity retrieving system in communication with at least one data source, said system comprising:
    a memory for storing a plurality of classes, and a plurality of agents, wherein:
        each of said classes defines a structure of said entities, said structure including a plurality of property definitions, each property definition identifying property values to be retrieved dedicated to said property definition, said property values being stored in said data sources; and
        each of said agents is dedicated to at least one of said classes, has an associated reliability parameter, and is provided for cooperating with an interface for accessing at least one particular property value pertaining to a particular entity of a class;
    a processor connected to the interface and in cooperation therewith configured for:
        receiving a query, said query including an identifier for identifying a particular class and at least one of said property values;
        selecting, among said classes, said particular class dedicated to said identifier under control of said query;
        accessing said data sources utilizing said agents;
        retrieving from said agents data pertaining to a particular property value that pertains to a particular entity that is comprised of at least said particular property value;
        comparing said data pertaining to said particular property value to determine whether inconsistencies exist in said data; and
        outputting at least an entity based upon whether there are inconsistencies in said data.

2. A system according to claim 1, wherein the processor is further configured for:
    displaying a single entity, based upon said particular property value, said single entity containing multiple entries for said particular property value if inconsistent data pertaining to said particular property value were retrieved by an agent, and the agent has a low reliability parameter associated with it;
    displaying a plurality of entities, based upon said particular property value, each of said plurality of entities containing a single entry for said particular property value if inconsistent data pertaining to said particular property value were retrieved by an agent, and the agent has a high reliability parameter associated with it;
    displaying a single entity, based upon said particular property value, said single entity containing multiple entries for said particular property value if inconsistent data pertaining to said particular property value were retrieved, and each individual data was retrieved by a different agent, and each agent has a low reliability parameter associated with it; and
    displaying a plurality of entities, based upon said particular property value, each of said plurality of entities containing a single entry for said particular property value if inconsistent data pertaining to said particular property value were retrieved, and each individual data was retrieved by a different agent, and each agent has a high reliability parameter associated with it.

3. A system according to claim 1, wherein the processor is further configured for:

displaying a single entity, based upon said particular property value, said single entity containing a single entry retrieved by a particular agent for said particular property value if inconsistent data pertaining to said particular property value were retrieved, and each individual data was retrieved by a different agent, and the reliability parameter associated with the said particular agent is substantially higher than the reliability parameter associated with the other agents.

4. A method according to claim 3, wherein the presentation is an XML presentation.

5. An entity retrieving system connectable to at least one data source, said system comprising:

a memory for storing a plurality of classes, wherein:

each of said classes defines a structure of said entities, said structure including a plurality of property definitions, each property definition identifying property values to be retrieved dedicated to said property definition, said property values being stored in said data sources, and said classes include at least one dependent class hierarchically linked to at least one other class, said dependent class comprising additional property definitions specifying additional property values, in addition to the property values of the classes from which it depends;

a processor connected to an interface and in cooperation therewith configured for:

receiving a query, said query including an identifier for identifying a particular class and at least one of said property values;

selecting, among said classes, said particular class dedicated to said identifier under control of said query;

accessing said data sources;

retrieving property values pertaining to at least one particular entity that comprise said at least one of said property values;

determining whether each particular entity to be retrieved pertains to one of said dependent classes of said selected particular class, retrieving, upon establishing that said particular entity pertains to one of said dependent classes of said selected particular class, said additional properties of said dependent class; and outputting the retrieved entities.

6. A system according to claim 1, further comprising means for producing a presentation of the retrieved entities based on a template.

7. A system according to claim 6, wherein the presentation is an XML presentation.

8. A system according to claim 1, wherein the processor is further configured for determining whether each particular entity to be retrieved pertains to one of said dependent classes of said selected particular class by:

applying a mutation pattern dedicated to said dependent class, wherein said mutation pattern includes at least one condition, each condition assigning at least one predetermined property value range to one of said property definitions of said class to which said dependent class is hierarchically linked, and verifying if the property value dedicated to said property definition of said particular entity falls within said predetermined property value ranges.

9. A system according to claim 1, wherein said memory is for storing further a plurality of models, wherein each of said classes are assigned to one of said models.

10. A system according to claim 1, further comprising:

means for displaying the retrieved entities to a user;

means for generating, upon receipt of said retrieved entities, at least one list, each list comprising a plurality of property value ranges for subdividing said retrieved entities, wherein said interface is further provided for enabling said user to select one property value range within one of said lists.

11. A system according to claim 1, wherein said memory further stores agents, each agent being dedicated to at least one of said classes, each agent being provided for cooperating with said interface for accessing at least one particular property value pertaining to said particular entity of said class, each agent employing:

an address for addressing one of said data sources from which said particular property values are to be retrieved, a series of instructions indicating which data from the addressed data source are to be retrieved by said agent, at least one agent parameter for assigning, for each property value to be retrieved, a portion of said data to one of said property definitions.

12. A system according to claim 11, wherein one of said agents employs a reliability parameter.

13. A system according to claim 11, wherein one of said agents employs a speciality indicator for indicating the type of the addressed data source.

14. A system according to claim 11, wherein one of said agents employs an authoritative indicator for indicating that if the property values retrieved by said agent are empty, then an indication that the entity does not exist is shown to a user of the system.

15. A system according to claim 11, wherein said processor is further configured for concurrently invoking a plurality of said agents.

16. A system according to claim 3, wherein said processor is further configured for:

establishing if one of said agent comprises a mutation indicator indicating that said agent is a mutation agent, and establishing if said particular entity pertains to said dependent class by verifying if said agent has established that said at least one particular property value pertaining to said particular entity is present, upon establishing that said agent comprises said mutation indicator.

17. A computer-implemented method for retrieving entities, comprising the steps of:

storing a plurality of class, wherein:

each of said classes defines a structure of said entities, said structure including a plurality of property definitions, each property definition identifying property values to be retrieved dedicated to said property definition, said property values being stored in said data sources, and said classes include at least one dependent class hierarchically linked to at least one other class, said dependent class comprising additional property definitions specifying additional property values, in addition to the property values of the classes from which it depends;

receiving a query, said query including an identifier for identifying a particular class and at least one of said property values;

selecting among said classes, said particular class dedicated to said identifier;

accessing said data sources;

retrieving property values pertaining to at least one particular entity that comprise said at least one of said property values;

establishing, for each particular entity to be retrieved, if said particular entity pertains to one of said dependent classes of said selected particular class; and retrieving, upon establishing that said particular entity pertains to one of said dependent classes of said selected particular class, said additional properties of said dependent class; and outputting the retrieved entities.

18. A method according to claim 17, further comprising the step of producing a presentation of the retrieved entities based on a template.

19. A method according to claim 17, wherein the step of establishing includes the steps of:

applying a mutation pattern dedicated to said dependent class, wherein said mutation pattern includes at least one condition, each condition assigning at least one predetermined property value range to one of said property definitions of said class to which said dependent class is hierarchically linked, and verifying if the property value dedicated to said property definition of said particular entity falls within said predetermined property value ranges.

20. A method according to claim 17, further comprising the step of storing a plurality of models, wherein each of said classes is assigned to one of said models.

21. A method according to claim 17, further comprising the steps of:

displaying the retrieved entities to a user; and generating, upon receipt of said retrieved entities, at least one list, each list comprising a plurality of property value ranges for subdividing said retrieved entities;

wherein said interface is further provided for enabling said user to select one property value range within one of said lists.

22. A method according to claim 17, further comprising the step of storing agents, each agent being dedicated to at least one of said classes, each agent being provided for cooperating with said interface for accessing at least one particular property value pertaining to said particular entity of said class, each agent employing:

an address for addressing one of said data sources from which said particular property values are to be retrieved, a series of instructions indicating which data from the addressed data source are to be retrieved by said agent, and at least one agent parameter for assigning, for each property value to be retrieved, a portion of said data to one of said property definitions.

23. A method according to claim 22, further comprising the steps of:

establishing if one of said agent comprises a mutation indicator indicating that said agent is a mutation agent, and establishing if said particular entity pertains to said dependent class by verifying if said agent has established that said at least one particular property value pertaining to said particular entity is present, upon establishing that said agent comprises said mutation indicator.

24. A method according to claim 22, wherein one of said agents employs a reliability parameter.

25. A method according to claim 22, wherein one of said agents employs a speciality indicator for indicating the type of the addressed data source.

26. A method according to claim 22, wherein one of said agents employs an authoritative indicator for indicating that if the property values retrieved by said agent are empty, then an indication that the entity does not exist is shown to a user of the system.

27. A method according to claim 22, further comprising the step of concurrently invoking a plurality of said agents.

* * * * *